(12) United States Patent
Morris

(10) Patent No.: US 12,478,385 B2
(45) Date of Patent: Nov. 25, 2025

(54) ORTHOPEDIC ARTICULATING INSTRUMENT

(71) Applicant: Bone Solutions, Inc., Colleyville, TX (US)

(72) Inventor: Frankie L. Morris, Colleyville, TX (US)

(73) Assignee: Bone Solutions, Inc., Colleyville, TX (US)

( * ) Notice: Subject to any disclaimer, the term of this patent is extended or adjusted under 35 U.S.C. 154(b) by 366 days.

(21) Appl. No.: 17/969,374

(22) Filed: Oct. 19, 2022

(65) Prior Publication Data

US 2023/0122627 A1 Apr. 20, 2023

Related U.S. Application Data

(60) Provisional application No. 63/257,647, filed on Oct. 20, 2021.

(51) Int. Cl.
*A61B 17/16* (2006.01)
*A61B 17/56* (2006.01)

(52) U.S. Cl.
CPC ...... *A61B 17/1659* (2013.01); *A61B 17/1631* (2013.01); *A61B 2017/564* (2013.01)

(58) Field of Classification Search
CPC ........ A61B 17/1671; A61B 17/320708; A61B 17/320758; A61B 17/320016
See application file for complete search history.

(56) References Cited

U.S. PATENT DOCUMENTS

| | | | | |
|---|---|---|---|---|
| 5,925,056 | A * | 7/1999 | Thomas | A61B 17/1615 606/180 |
| 9,795,395 | B2 * | 10/2017 | Lizardi | A61B 17/1622 |
| 2005/0113838 | A1 * | 5/2005 | Phillips | A61B 17/22031 606/86 R |
| 2008/0114364 | A1 * | 5/2008 | Goldin | A61B 17/1617 606/170 |

* cited by examiner

*Primary Examiner* — Andrew Yang
(74) *Attorney, Agent, or Firm* — McDonnell Boehnen Hulbert & Berghoff LLP

(57) ABSTRACT

The present disclosure relates to an orthopedic instrument. The orthopedic instrument includes an elongated hollow shaft having a proximal end and a distal end. The orthopedic instrument also includes a rod having a proximal end and a distal end. The rod is positioned at least partially within a lumen of the elongated hollow shaft. The orthopedic instrument also includes a cutting head having a proximal end and a distal end, wherein the proximal end of the cutting head is coupled to the distal end of the rod. The cutting head is rotatably coupled to the distal end of the elongated hollow shaft between the proximal end of the cutting head and the distal end of the cutting head. A movement of the rod within the lumen of the elongated hollow shaft in a distal direction causes cutting head to transition from a straight configuration to an angled configuration.

16 Claims, 5 Drawing Sheets

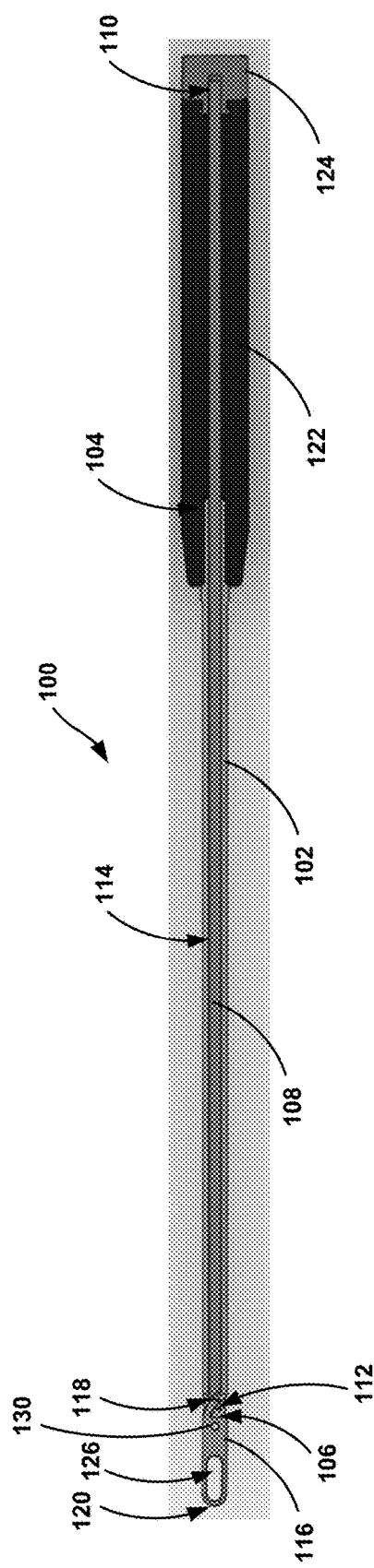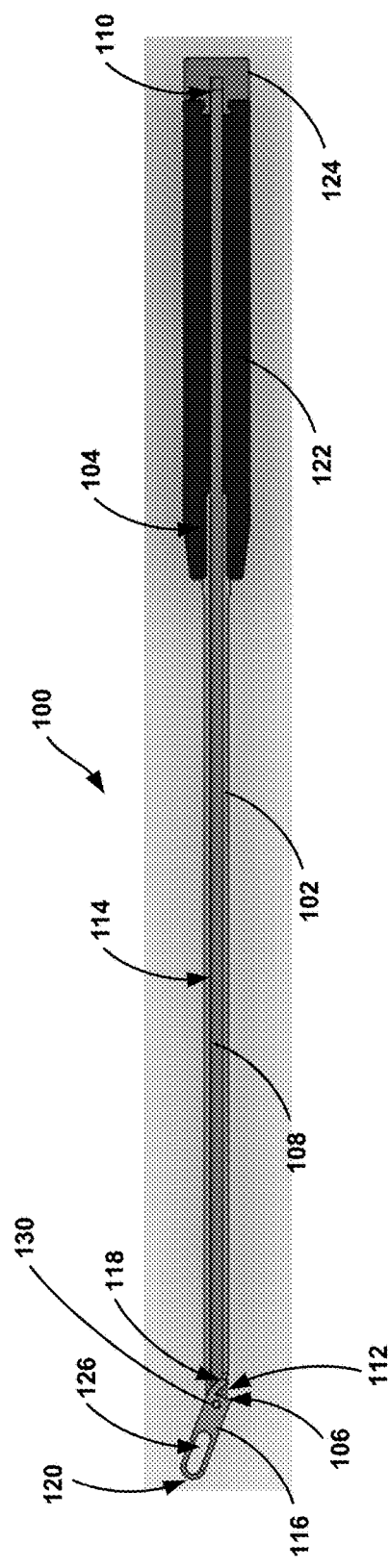
Fig. 2A
Fig. 2B

ORTHOPEDIC ARTICULATING INSTRUMENT

RELATED APPLICATIONS

This application claims priority to U.S. Provisional Application No. 63/257,647 entitled "Orthopedic Articulating Instrument," filed on Oct. 20, 2021, the contents of which are hereby incorporated by reference in its entirety.

TECHNICAL FIELD

The present disclosure relates to an orthopedic articulating instrument for use in surgery, particularly in orthopedic applications.

BACKGROUND

Unless otherwise indicated herein, the materials described in this section are not admitted to be prior art to the claims in this application.

It is known to use curettes in surgical and other medical procedures to debride or clean spaces or cavities in the body. Orthopedic procedures utilizing existing curettes require an open procedure wherein an incision is made through the skin and the underlying muscle and other tissue to fully expose the relevant joint. While this approach provides surgeons with an excellent view of the bone surface and open access for various sized and shaped instruments, the underlying damage to the soft tissue, including the muscles, can lengthen a patient's healing and rehabilitation time after surgery. Therefore, it is desirable to minimize the size of the incision and the damage to the underlying muscle.

What is needed in the art is a method and device for cleaning out bone cavities which are larger than the incision of the soft tissue and/or aperture into the bone, and without requiring expensive and separate boring and reaming instruments.

SUMMARY

In view of the foregoing, the present disclosure provides a device and corresponding method for cutting a cavity in a structure, the cavity having a greater diameter than the aperture providing access to the cavity.

In a first aspect, the present disclosure provides an orthopedic instrument. The orthopedic instrument includes an elongated hollow shaft having a proximal end and a distal end. The orthopedic instrument also includes a rod having a proximal end and a distal end. The rod is positioned at least partially within a lumen of the elongated hollow shaft. The orthopedic instrument also includes a cutting head having a proximal end and a distal end, wherein the proximal end of the cutting head is coupled to the distal end of the rod. The cutting head is rotatably coupled to the distal end of the elongated hollow shaft between the proximal end of the cutting head and the distal end of the cutting head. A movement of the rod within the lumen of the elongated hollow shaft in a distal direction causes cutting head to transition from a straight configuration to an angled configuration.

In a second aspect, the present invention provides a method for reaming a cavity in a bone, the method comprising: providing the orthopedic instrument of the first aspect, (ii) forming an opening in the bone, the opening having a diameter at least as large as a diameter of the elongated hollow shaft, (iii) inserting the orthopedic instrument into the opening, the orthopedic instrument being in the straight configuration, (iv) transitioning the cutting head to the angled configuration, wherein a cross-sectional diameter of the of the cutting head in the angled configuration is greater than a diameter of the elongated hollow shaft, (v) rotating the cutting head to thereby form the cavity in the bone, (vi) transitioning the cutting head to the straight configuration, and (vii) removing the orthopedic instrument from the cavity.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 2A illustrates a side cross-sectional view of the orthopedic instrument of FIG. 1 in a straight configuration, according to an exemplary embodiment.

FIG. 2B illustrates a side cross-sectional view of the orthopedic instrument of FIG. 1 in an angled configuration, according to an exemplary embodiment

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The exemplary embodiments described herein are not meant to be limiting. It will be readily understood that the aspects of the present disclosure, as generally described herein and illustrated in the figures, can be arranged, substituted, combined, separated, and designed in a wide variety of different configurations, all of which are explicitly contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

As used herein, "distal" with respect to a portion of the apparatus means the end of the device (when in use) nearer the treatment zone (e.g., the cavity in a structure) of the subject and the term "proximal" means the portion of the device (when in use) further away from the treatment zone of the subject and nearer the access site and the operator.

As used herein, with respect to measurements, "about" means+/−5%.

The present disclosure provides an articulating orthopedic instrument for use in orthopedic surgery. In particular, the orthopedic instrument may be a bone curette used to remove a bone defect from a bone to create a cavity therein. Additional use cases are contemplated as well.

Figure 1:
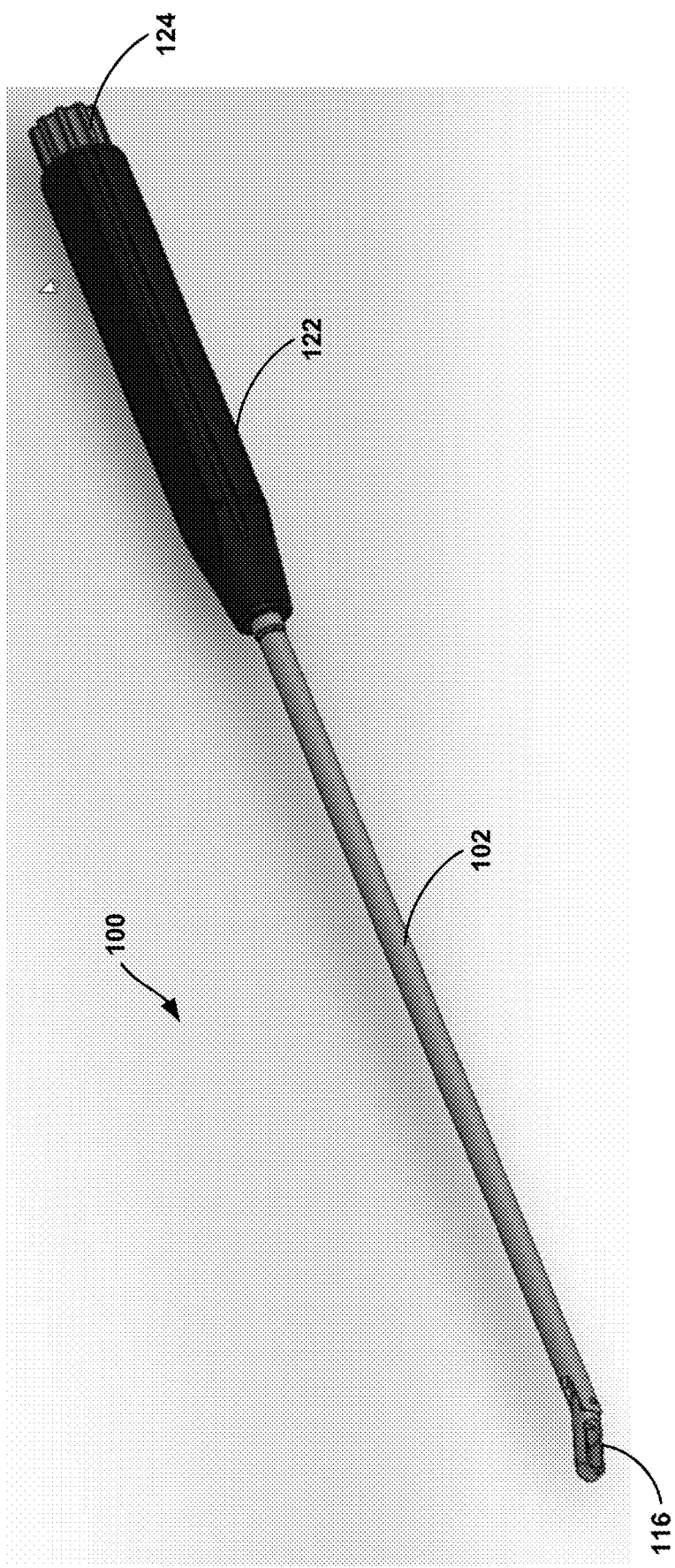
FIG. 1 illustrates a perspective view of an orthopedic instrument in an angled configuration, according to an exemplary embodiment.

With reference to the figures, the present disclosure provides an orthopedic instrument 100. FIG. 1 illustrates perspective view of an orthopedic instrument 100 in an angled configuration. FIG. 2A illustrates a side cross-sectional view of the orthopedic instrument of FIG. 1 in a straight configuration, while FIG. 2B illustrates a side cross-sectional view of the orthopedic instrument of FIG. 1 in an angled configuration. As shown in FIGS. 2A-2B, the orthopedic instrument 100 includes an elongated hollow shaft 102 having a proximal end 104 and a distal end 106. The orthopedic instrument 100 further includes a rod 108 having a proximal end 110 and a distal end 112. The rod 108 is positioned at least partially within a lumen 114 of the elongated hollow shaft 102, as shown in the side cross-sectional views of FIGS. 2A-2B.

The orthopedic instrument 100 further includes a cutting head 116 having a proximal end 118 and a distal end 120. The proximal end 118 of the cutting head 116 is coupled to the distal end 112 of the rod 108. The cutting head 116 is rotatably coupled to the distal end 106 of the elongated hollow shaft 102 between the proximal end 118 of the cutting head 116 and the distal end 120 of the cutting head 116. A movement of the rod 108 within the lumen 114 of the elongated hollow shaft 102 in a distal direction causes cutting head 116 to transition from a straight configuration (shown in FIG. 2A) to an angled configuration (shown in FIG. 2B). Conversely, a movement of the rod 108 within the lumen 114 of the elongated hollow shaft 102 in a proximal direction causes cutting head 116 to transition from the angled configuration to the straight configuration.

As shown in FIG. 1, the orthopedic instrument 100 may further include a handle 122 coupled to the proximal end 104 of the elongated hollow shaft 102. The handle 122 may include a gripping member for a user to grip and rotate the orthopedic instrument 100 when in use.

Further, the orthopedic instrument 100 includes an adjustment mechanism 124 coupled to the rod 108. The adjustment mechanism 124 is configured to move the rod 108 within the lumen 114 of the elongated hollow shaft 102 to thereby transition the cutting head 116 from the straight configuration to the angled configuration and vice versa. The adjustment mechanism 124 may take a variety of forms. In one example, the adjustment mechanism 124 comprises a rotatable component, where a rotation of the rotatable component in a first direction causes a movement of the rod 108 within the lumen 114 of the elongated hollow shaft 102 in a distal direction to thereby transition the cutting head 116 from the straight configuration to the angled configuration, and a rotation of the rotatable component in a second direction causes a movement of the rod 108 within the lumen 114 of the elongated hollow shaft 102 in a proximal direction to thereby transition the cutting head 116 from the angled configuration to the straight configuration.

In another example, the adjustment mechanism 124 comprises a slidable component, where movement of the slidable component in a distal direction causes a movement of the rod 108 within the lumen 114 of the elongated hollow shaft 102 in a distal direction to thereby transition the cutting head 116 from the straight configuration to the angled configuration, and a movement of the slidable component in a proximal direction causes a movement of the rod 108 within the lumen 114 of the elongated hollow shaft 102 in a proximal direction to thereby transition the cutting head 116 from the angled configuration to the straight configuration. In one example, the slidable component may interact with notches or other protrusions that correspond to different cross-sectional diameters of the cutting head 116. Other arrangements of the adjustment mechanism 124 are possible as well.

Figure 3A:
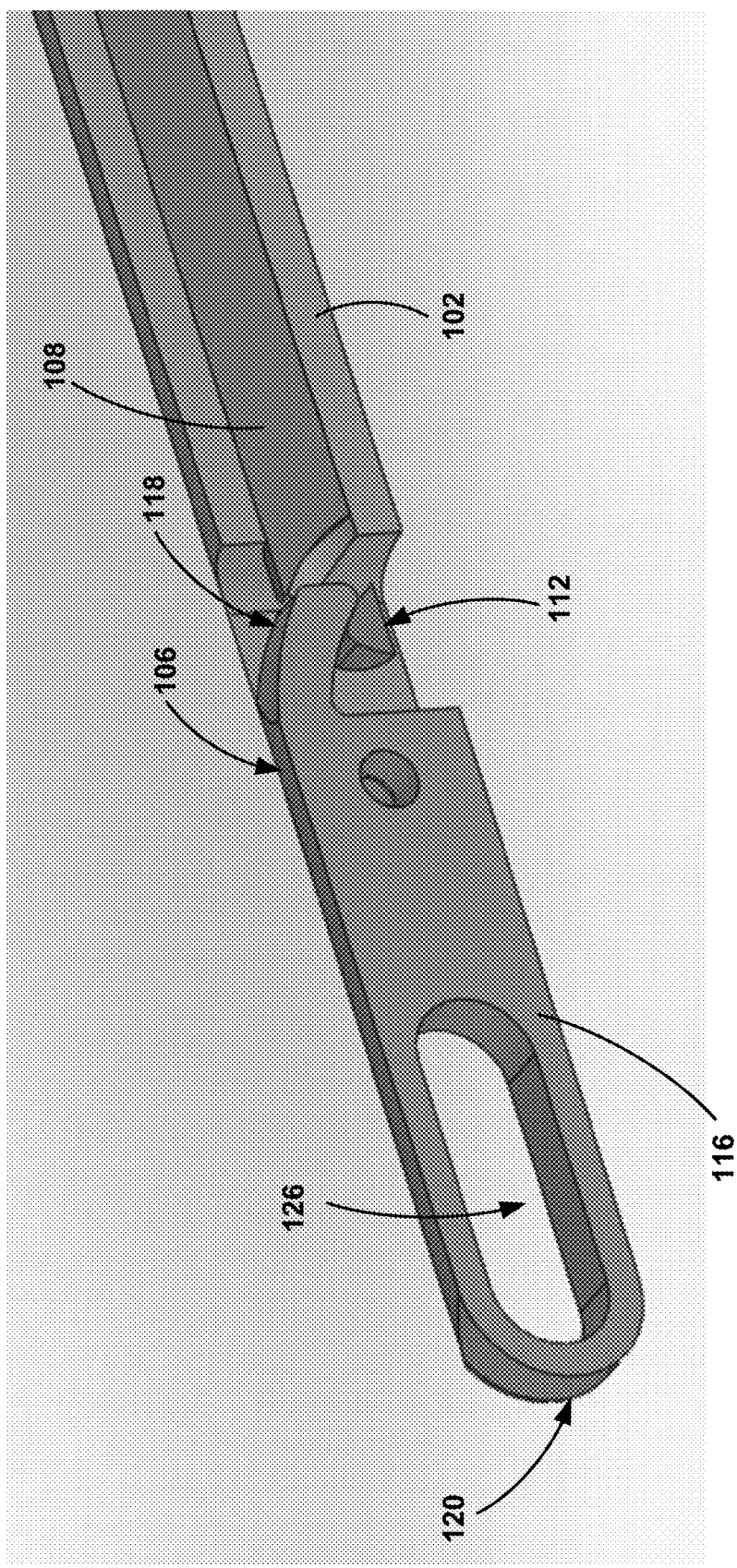
FIG. 3A illustrates a perspective cross-sectional view of the distal end of the orthopedic instrument of FIG. 1 in a straight configuration, according to an exemplary embodiment.
Figure 3B:
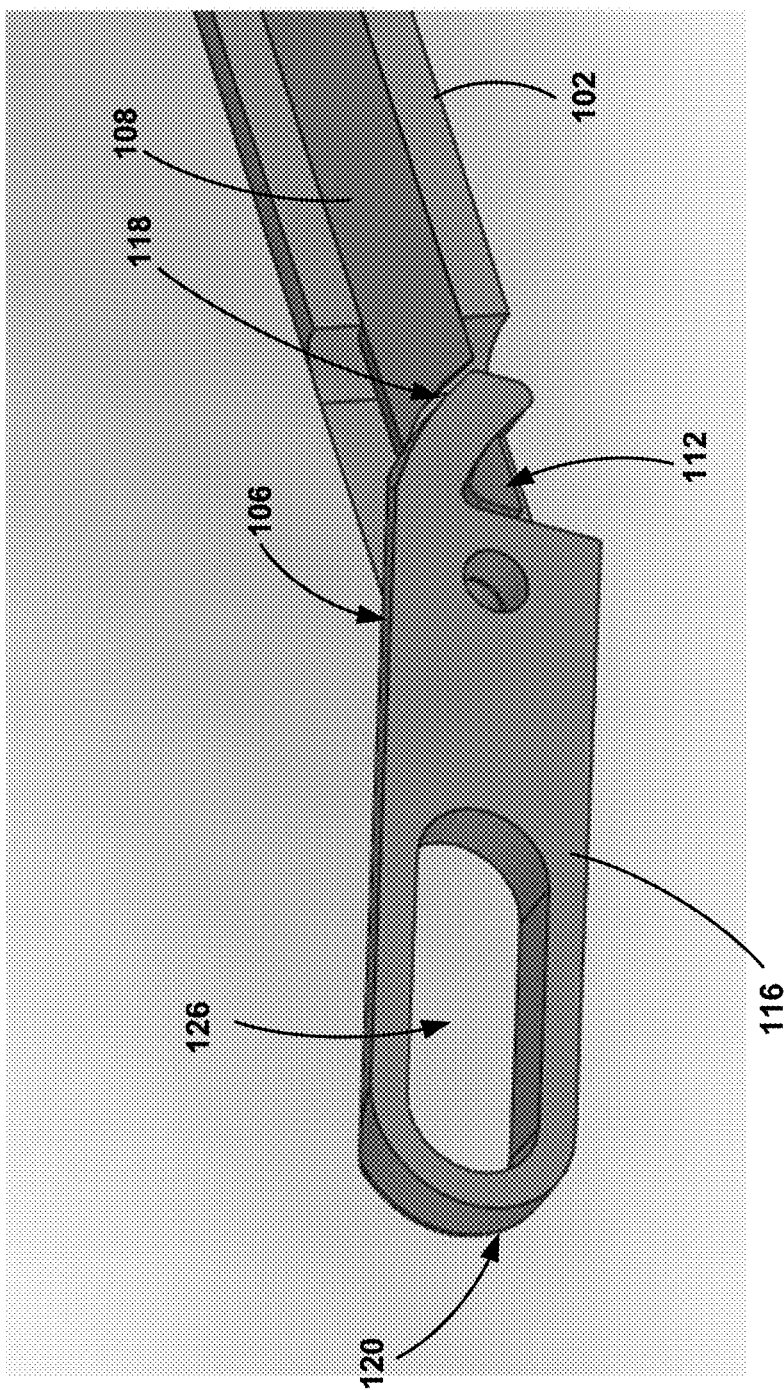
FIG. 3B illustrates a perspective cross-sectional view of the distal end of the orthopedic instrument of FIG. 1 in an angled configuration, according to an exemplary embodiment.

In one example, as shown in the cross-sectional views of FIGS. 3A-3B, the proximal end 118 of the cutting head 116 may include an arm extending in the proximal direction. As the rod 108 moves within the lumen 114 of the elongated hollow shaft 102 in a distal direction, the distal end 112 of the rod 108 contacts the top surface of the arm of the cutting head 116, and causes the cutting head to rotate in a clockwise direction around the pivot point to the angled configuration. Conversely, when the rod 108 moves within the lumen 114 of the elongated hollow shaft 102 in a proximal direction, the distal end 112 of the rod 108 contacts the bottom surface of the arm of the cutting head 116, and causes the cutting head to rotate in a counterclockwise direction around the pivot point to the straight configuration.

Figure 3C:
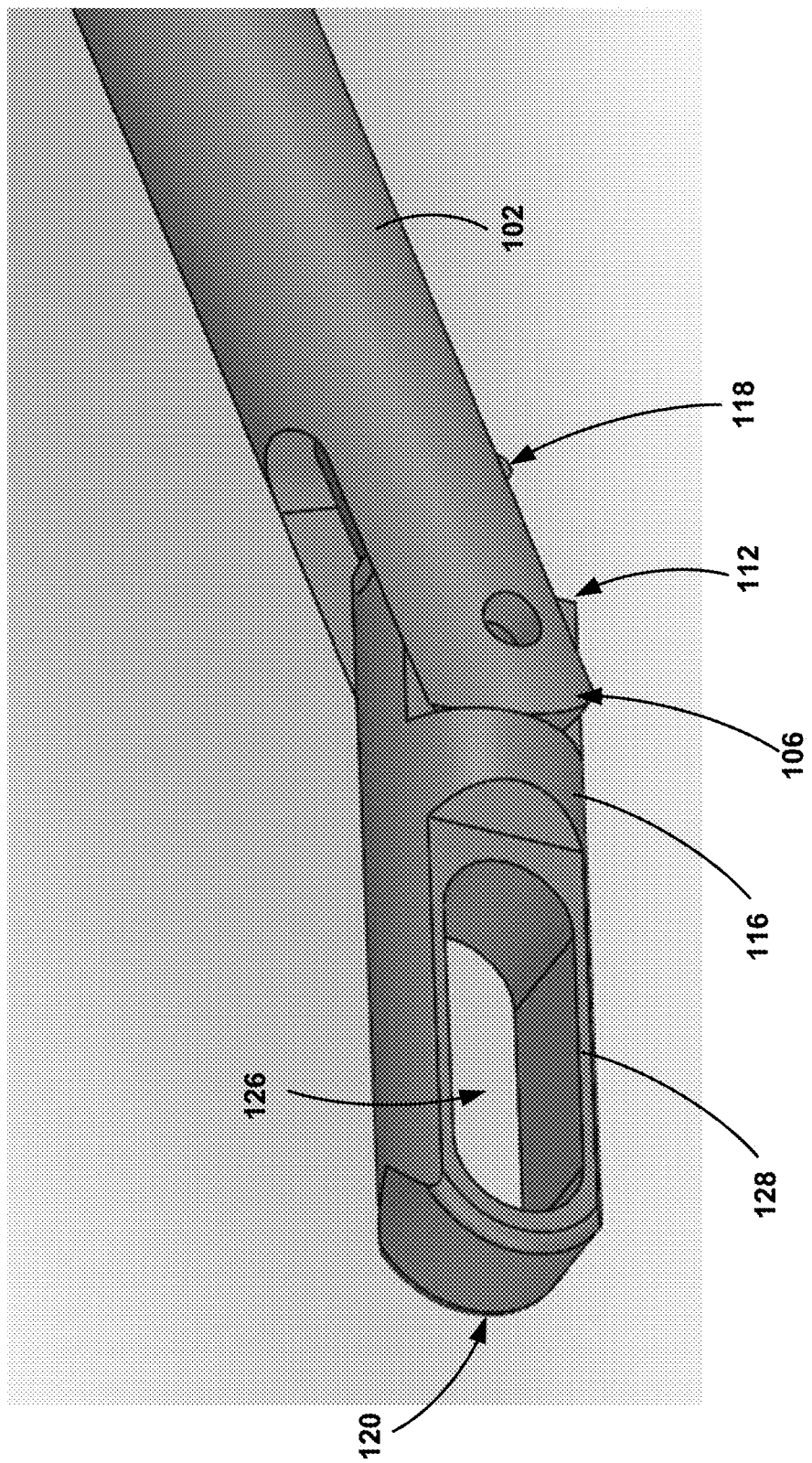
FIG. 3C illustrates a perspective view of the distal end of the orthopedic instrument of FIG. 1 in an angled configuration, according to an exemplary embodiment.

In one example, the cutting head 116 includes a through-hole 126, and an inner edge of the through-hole 126 includes a cutting surface 128, as shown in FIG. 3C. In one example, the through-hole 126 has an elliptical shape. In another example, the through-hole 126 has a teardrop shape.

As shown in FIG. 2A, a cross-sectional diameter of the cutting head 116 in the straight confirmation is equal to a cross-sectional diameter of the elongated hollow shaft 102. As shown in FIG. 2B, a cross-sectional diameter of the cutting head 116 in the angled confirmation is greater than a cross-sectional diameter of the elongated hollow shaft 102.

In one example, the orthopedic instrument further includes a pin 130 coupled to the elongated hollow shaft 102 and positioned through the cutting head 116 to provide a pivot point for a rotation of the cutting head 116 from the straight configuration to the angled configuration and vice versa.

In operation, the present invention provides a method for reaming a cavity in a bone, the method comprising: (i) providing the orthopedic instrument 100 of any of the embodiments described above, (ii) forming an opening in the bone, the opening having a diameter at least as large as a diameter of the elongated hollow shaft 102, (iii) inserting the orthopedic instrument 100 into the opening, the orthopedic instrument 100 being in the straight configuration, (iv) transitioning the cutting head 116 to the angled configuration, wherein a cross-sectional diameter of the of the cutting head 116 in the angled configuration is greater than a diameter of the elongated hollow shaft 102, (v) rotating the orthopedic instrument 100 to thereby form the cavity in the bone, (vi) transitioning the cutting head 116 to the straight configuration, and (vii) removing the orthopedic instrument 100 from the cavity.

In another embodiment, the method further includes aspirating the cavity after removing the orthopedic instrument 100 from the cavity. In one particular example, the cavity may be flushed with a combination of irrigation and suction to achieve the aspiration of the cavity.

In another embodiment, the method further includes backfilling the cavity and the opening with a reabsorbable bio-material composition. Such a reabsorbable bio-material composition may be osteoconductive and osteoinductive, thereby enabling new bone growth in the cavity. In such an example, the reabsorbable bio-material composition turns to bone to provide bone structure in the bone.

In another embodiment, the method further includes removing a bone defect from the bone to create the cavity. The bone defect may take a variety of forms. In particular, the bone defect may be selected from a group consisting of: a bone cyst, a bone marrow lesion, and an osteoporotic bone. A bone cyst is a fluid-filled hole that develops inside a bone. Bone cysts do not usually cause any symptoms, they are not cancerous and they do not usually pose a serious threat to health. Bone marrow lesions (BMLs) or using older terminology "bone marrow edema" is characterized by excessive water signals in the marrow space on magnetic resonance imaging or ultrasound; BMLs constitute a central component of a wide variety of inflammatory and non-inflammatory rheumatologic conditions affecting the musculoskeletal system: BMLs are not only considered significant sources of pain but also linked to increased disease activity in many musculoskeletal conditions (for example, osteoarthritis, rheumatoid arthritis). The bone defects of the above method may be defects of the extremities and/or pelvic bone, as specific examples.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Because many modifications, variations, and changes in detail can be made to the described example, it is intended that all matters in the preceding description and shown in the accompanying figures be interpreted as illustrative and not in a limiting sense. Further, it is intended to be understood that the following clauses (and any combination of the clauses) further describe aspects of the present description.

What is claimed is:

1. An orthopedic instrument, comprising:
    an elongated hollow shaft having a proximal end and a distal end;
    a rod having a proximal end and a distal end, wherein the rod is positioned at least partially within a lumen of the elongated hollow shaft; and
    a cutting head having a proximal end and a distal end, wherein the proximal end of the cutting head is directly coupled to the distal end of the rod via a curved contact surface at the proximal end of the cutting head, wherein the cutting head is rotatably coupled to the distal end of the elongated hollow shaft at a pivot point between the proximal end of the cutting head and the distal end of the cutting head, and wherein a movement of the rod within the lumen of the elongated hollow shaft in a distal direction causes the rod to contact a portion of the curved contact surface of the cutting head to thereby cause the cutting head to transition from a straight configuration to an angled configuration wherein the portion of the curved contact surface is entirely positioned opposite the pivot point from the distal end of the cutting head.

2. The orthopedic instrument of claim 1, further comprising:
    a handle coupled to the proximal end of the elongated hollow shaft.

3. The orthopedic instrument of claim 1, further comprising:
    an adjustment mechanism coupled to the rod, wherein the adjustment mechanism is configured to move the rod within the lumen of the elongated hollow shaft to thereby transition the cutting head from the straight configuration to the angled configuration and vice versa.

4. The orthopedic instrument of claim 3, wherein the adjustment mechanism comprises a rotatable component, wherein a rotation of the rotatable component in a first direction causes a movement of the rod within the lumen of the elongated hollow shaft in a distal direction to thereby transition the cutting head from the straight configuration to the angled configuration, and wherein a rotation of the rotatable component in a second direction causes a movement of the rod within the lumen of the elongated hollow shaft in a proximal direction to thereby transition the cutting head from the angled configuration to the straight configuration.

5. The orthopedic instrument of claim 3, wherein the adjustment mechanism comprises a slidable component.

6. The orthopedic instrument of claim 1, wherein the cutting head includes a through-hole, and wherein an inner edge of the through-hole includes a cutting surface.

7. The orthopedic instrument of claim 6, wherein the through-hole has an elliptical shape.

8. The orthopedic instrument of claim 6, wherein the through-hole has a teardrop shape.

9. The orthopedic instrument of claim 1, wherein a cross-sectional diameter of the cutting head in the straight configuration is equal to a cross-sectional diameter of the elongated hollow shaft.

10. The orthopedic instrument of claim 1, wherein a cross-sectional diameter of the cutting head in the angled configuration is greater than a cross-sectional diameter of the elongated hollow shaft.

11. The orthopedic instrument of claim 1, further comprising:
    a pin coupled to the elongated hollow shaft and positioned through the cutting head to provide a pivot point for a rotation of the cutting head from the straight configuration to the angled configuration.

12. A method for reaming a cavity in a bone, the method comprising:
    (i) providing the orthopedic instrument of claim 1;
    (ii) forming an opening in the bone, the opening having a diameter at least as large as a diameter of the elongated hollow shaft;
    (iii) inserting the orthopedic instrument into the opening, the orthopedic instrument being in the straight configuration;
    (iv) transitioning the cutting head to the angled configuration, wherein a cross-sectional diameter of the of the cutting head in the angled configuration is greater than a diameter of the elongated hollow shaft;
    (v) rotating the cutting head to thereby form the cavity in the bone;
    (vi) transitioning the cutting head to the straight configuration; and
    (vii) removing the orthopedic instrument from the cavity.

13. The method of claim 12, further comprising:
    aspirating the cavity after removing the orthopedic instrument from the cavity.

14. The method of claim 12, further comprising:
    back-filling the cavity and the opening with a reabsorbable bio-material composition, wherein the reabsorbable bio-material composition is osteoconductive and osteoinductive, thereby enabling new bone growth in the cavity.

15. The method of claim 14, wherein the reabsorbable bio-material composition turns to bone to provide bone structure in the bone.

16. The method of claim 12, further comprising:
removing a bone defect from the bone to create the cavity.

* * * * *